US012410838B2

(12) United States Patent
Shimanaka

(10) Patent No.: US 12,410,838 B2
(45) Date of Patent: Sep. 9, 2025

(54) SELECTABLE CLUTCH

(71) Applicant: TSUBAKIMOTO CHAIN CO., Osaka (JP)

(72) Inventor: Yoshihito Shimanaka, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/917,626

(22) Filed: Oct. 16, 2024

(65) Prior Publication Data

US 2025/0137501 A1    May 1, 2025

(30) Foreign Application Priority Data

Oct. 30, 2023   (JP) ................... 2023-185230

(51) Int. Cl.
*F16D 41/12*      (2006.01)
*F16D 41/08*      (2006.01)
*F16D 41/16*      (2006.01)
*F16D 41/064*     (2006.01)

(52) U.S. Cl.
CPC ......... *F16D 41/125* (2013.01); *F16D 41/086* (2013.01); *F16D 41/16* (2013.01); *F16D 41/064* (2013.01)

(58) Field of Classification Search
CPC ........ F16D 41/06; F16D 41/064; F16D 41/08; F16D 41/086; F16D 41/125; F16D 41/16; F16D 41/088
See application file for complete search history.

(56) References Cited

U.S. PATENT DOCUMENTS

| 11,549,559 | B1 * | 1/2023 | Brevick | F16D 41/16 |
| 12,092,172 | B2 * | 9/2024 | Finn | F16D 41/14 |
| 2008/0006499 | A1 * | 1/2008 | Joki | F16D 27/01 |
| | | | | 192/41 A |

(Continued)

FOREIGN PATENT DOCUMENTS

| DE | 662730 C | * | 7/1938 |
| JP | 11-182589 A |   | 7/1999 |

(Continued)

OTHER PUBLICATIONS

Translation of DE662730C.*

*Primary Examiner* — Timothy Hannon
(74) *Attorney, Agent, or Firm* — WHDA, LLP

(57) ABSTRACT

To provide a simple-structured selectable clutch that can be switched between operating modes, has high responsiveness, allows a desired torque capacity to be secured, causes less rattling and noise, and allows for switching with a small force even when transmitting a large torque. The clutch includes a first clutch mechanism configured to transmit rotation at any rotation angle via movable and/or rotatable locking members disposed between a first rotating element and a second rotating element, a second clutch mechanism configured to transmit rotation at a predetermined angle by engagement between a first engaging element and a second engaging element, and an operating mechanism for switching the actions of at least the first clutch mechanism and/or second clutch mechanism. The clutch is configured to allow switching between transmission and interruption of torque between relatively rotatable first and second shafts.

9 Claims, 4 Drawing Sheets

(56) References Cited

U.S. PATENT DOCUMENTS

| | | |
|---|---|---|
| 2014/0326565 A1 | 11/2014 | Iwano et al. |
| 2020/0109749 A1* | 4/2020 | Thomas ................ F16D 41/125 |
| 2022/0056963 A1 | 2/2022 | Nakagawa et al. |
| 2023/0279907 A1* | 9/2023 | Beiser .................. F16D 41/125 |
| | | 192/21 |

FOREIGN PATENT DOCUMENTS

| | | |
|---|---|---|
| JP | 2011-220509 A | 11/2011 |
| JP | 2014-219015 A | 11/2014 |
| JP | 2020-190255 A | 11/2020 |

* cited by examiner

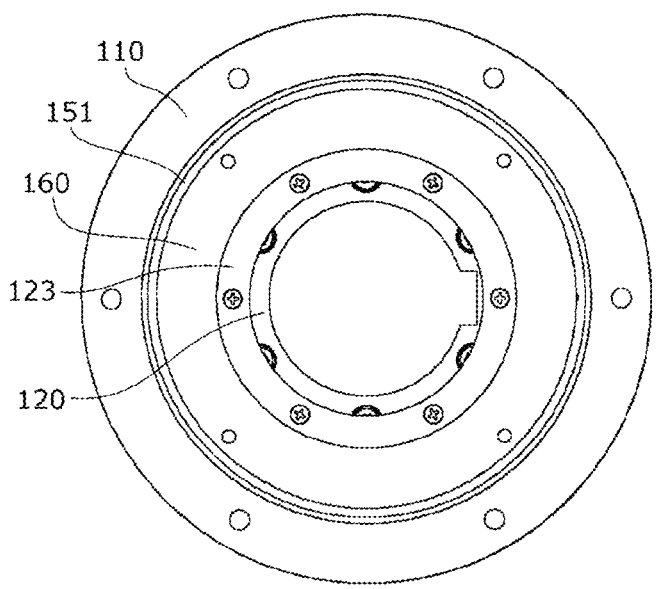
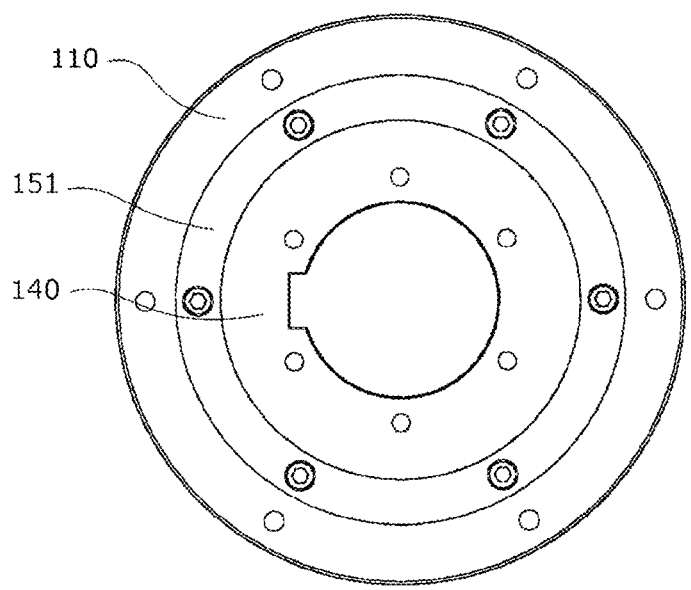

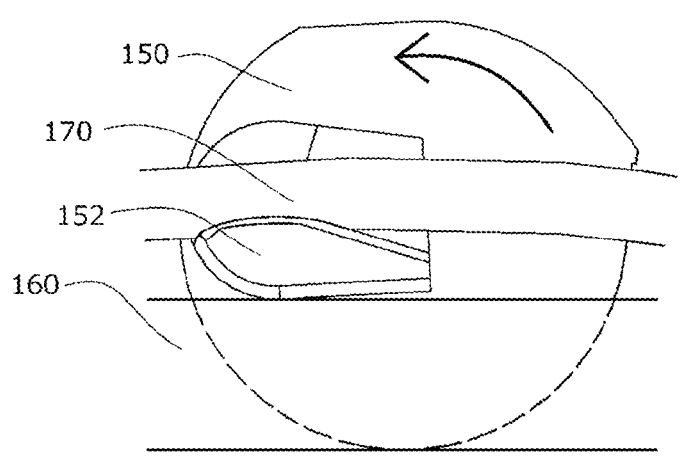

SELECTABLE CLUTCH

BACKGROUND OF THE INVENTION

1. Field of the Invention

The present invention relates to a selectable clutch that includes a clutch mechanism for transmitting and interrupting rotation between coaxial and relatively rotatable first and second shafts, and an operating mechanism for switching the actions of the clutch mechanism, to allow switching between transmission and interruption of torque between the relatively rotatable first and second shafts.

2. Description of the Related Art

As one type of clutch that controls the transmission and interruption of rotation between two shafts, two-way switchable clutches that can drive and freewheel in both forward and reverse directions are known.

Known ratchet clutches and dog clutches can transmit rotation only at a predetermined rotation angle, and are prone to rattling and large noise because of the rigid engagement when transmitting rotation.

Some types of two-way clutches are configured to switch between a locked state that prohibits relative rotation between inner and outer races (transmits the rotary force) and a free state that allows relative rotation between the inner and outer races (interrupts the rotary force) by tilting cams or sprags (see, for example, Japanese Patent Application Publications Nos. 2011-220509 and H11-182589). These clutches can transmit rotation at any rotation angle.

Japanese Patent Application Publication No. 2014-219015 describes a two-way clutch with a switch mechanism that allows for transmission of rotation at any rotation angle. The switch mechanism enables switching between three operating modes, i.e., two-way free mode, one-way lock mode, and two-way lock mode, by controlling a retainer that retains rollers or power transmission members either at a neutral position or at one engaged position on a cam surface formed on the inner circumference of the outer race.

SUMMARY OF THE INVENTION

The two-way clutch described in Japanese Patent Application Publication No. 2011-220509 switches between engagement and disengagement between an input-side rotating element and an output-side rotating element by means of sprags that are tilted in the same direction as the rotation direction of the input-side rotating element when the input-side rotating element is rotated relative to the output-side rotating element. This poses the problem of poor responsiveness due to the time lost when the rotation direction is switched. The two-way clutch described in Japanese Patent Application Publication No. H11-182589 entails the same problem.

The two-way clutch described in Japanese Patent Application Publication No. 2014-219015 uses plate spring members to allow for power transmission in both directions. The problem with this two-way clutch is that the torque that can be transmitted is small for the size of the two-way clutch because it relies on friction for the power transmission.

With a view to solve these problems and to provide a simple-structured cam clutch that can be switched between operating modes, has high responsiveness, and allows a desired torque capacity to be secured, the applicants invented a cam clutch with an operating mode switch mechanism presented in Japanese Patent Application Publication No. 2020-190255.

In this type of clutch, the cams or rollers wedged between the races can move in their respective directions at free positions when locking the races. When torque starts to be applied, the races rotate slightly relative to each other, causing the cams or rollers to jam tightly and transmit torque. In the two-way lock mode, even after the torque is removed, this slight relative rotation in one direction in which some of the cams or rollers are disengaged can cause the other cams or rollers to move and wedge in the other direction. Thus some of the cams or rollers may remain wedged in both directions.

Switching to the two-way free mode or one-way free mode in this state requires a force to disengage the cams or rollers. When the transmitted torque is large, the cams or rollers are wedged more firmly. Therefore, for applications involving transmission of large torque, a switching mechanism with a structure that is able to generate a large force was required.

The present invention solves these problems, and aims to provide a simple-structured selectable clutch that can be switched between operating modes, has high responsiveness, allows a desired torque capacity to be secured, causes little rattling and noise, and allows for switching with a small force even when transmitting a large torque.

The above object is achieved by a selectable clutch according to the present invention, including: a first clutch mechanism and a second clutch mechanism for transmitting and interrupting rotation between coaxial and relatively rotatable first and second shafts, and an operating mechanism for switching actions of at least the first clutch mechanism and/or the second clutch mechanism, to allow switching between transmission and interruption of torque between the relatively rotatable first and second shafts, the first clutch mechanism being configured to transmit rotation at any rotation angle via a movable and/or rotatable locking member disposed between a first rotating element and a second rotating element, the second clutch mechanism being configured to transmit rotation at a predetermined angle by engagement between a first engaging element and a second engaging element.

According to one aspect of the present application, the first clutch mechanism is configured to transmit rotation at any rotation angle via a movable and/or rotatable locking member disposed between a first rotating element and a second rotating element, and the second clutch mechanism is configured to transmit rotation at a predetermined angle by engagement between a first engaging element and a second engaging element. The first clutch mechanism that is able to transmit rotation at any rotation angle allows for smooth transmission of rotation in both directions in the two-way lock mode. When the torque is removed, no jamming occurs in the second clutch mechanism during the relative rotation in which the engagement is released in the first clutch mechanism. This means that the switching operation can be performed with a small force even when the transmitted torque is large.

In the one-way free mode, the first clutch mechanism operates and the second clutch mechanism is released. This allows for relative rotation with very little noise and rotation resistance.

According to another aspect of the present application, the first clutch mechanism has a configuration known as a cam clutch. This allows for switching of the first clutch mechanism between operating modes with a simple structure and helps secure high responsiveness and a desired torque capacity.

According to another aspect of the present application, the second clutch mechanism has a configuration known as a one-way ratchet clutch. This helps secure high responsiveness and a desired torque capacity.

According to another aspect of the present application, the first engaging element and the second engaging element face each other in an axial direction, and the operating mechanism is configured to move either the first engaging element or the second engaging element in an axial direction. This allows for switching of the second clutch mechanism between operating modes with a simple structure.

According to another aspect of the present application, the first engaging element is formed by a plurality of ratchet pawls provided on an end face of the outer race, and the second engaging element is formed by a plurality of ratchet teeth disposed to extend from an end face of the inner race radially outward. This allows the clutch to be simple-structured and compact.

BRIEF DESCRIPTION OF THE DRAWINGS

FIG. 6 is a front view of the selectable clutch shown in FIG. 1;

FIG. 7 is a rear view of the selectable clutch shown in FIG. 1; and

FIG. 8 is an enlarged view illustrating a cam.

DESCRIPTION OF THE PREFERRED EMBODIMENT

Figure 1:
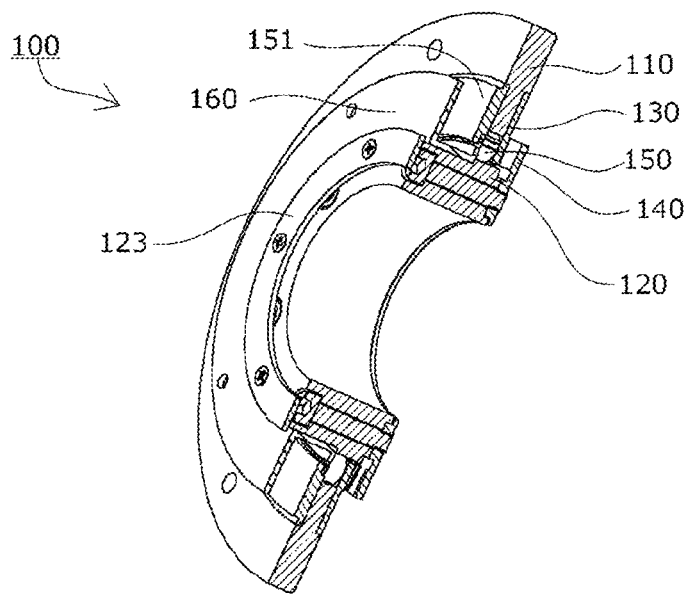
FIG. 1 is a perspective view with a cross section of a selectable clutch according to one embodiment of the present invention.
Figure 2:
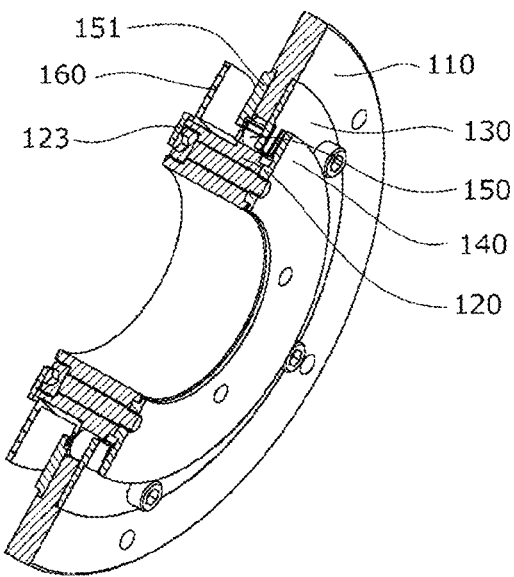
FIG. 2 is a perspective view with a cross section of the selectable clutch shown in FIG. 1 seen from a different direction.
Figure 3:
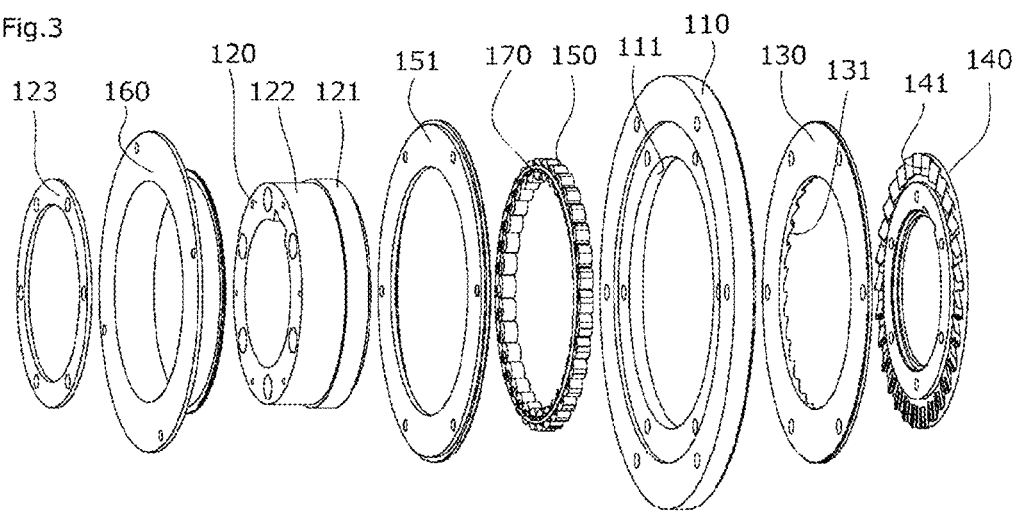
FIG. 3 is an exploded view illustrating the selectable clutch shown in FIG. 1.
Figure 4:
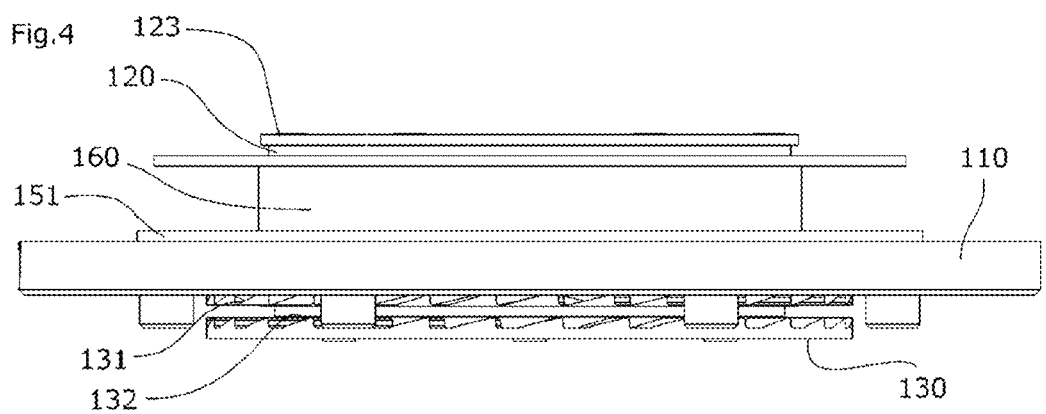
FIG. 4 is a side view of the selectable clutch shown in FIG. 1.
Figure 5:
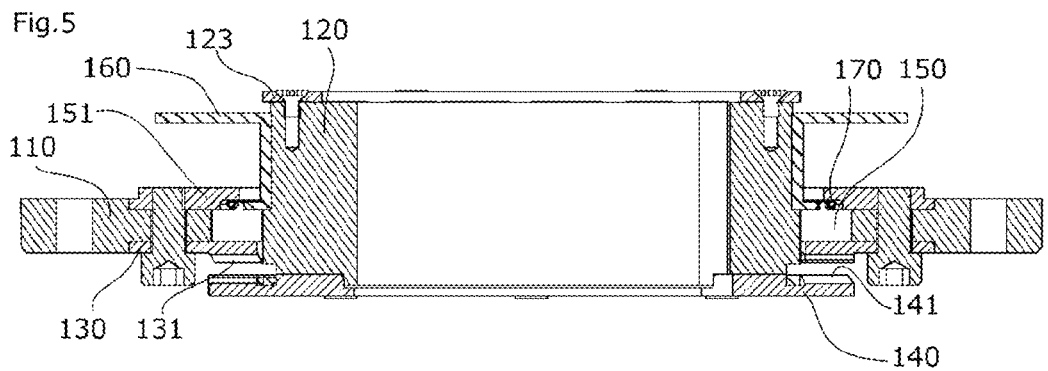
FIG. 5 is a side view with a cross section of the selectable clutch shown in FIG. 1.

One embodiment of the present invention is described with reference to FIGS. 1 to 7. Note, however, the present invention is not limited to this embodiment.

As shown in FIGS. 1 to 7, the selectable clutch 100 according to one embodiment of the present invention includes a first clutch mechanism and a second clutch mechanism for transmitting and interrupting rotation between coaxial and relatively rotatable first and second shafts, and an operating mechanism for switching the actions of the first and second clutch mechanisms. The first clutch mechanism is a cam clutch configured to transmit rotation at any rotation angle, which is made up of an inner race 120 that is a first rotating element, an outer race 110 that is a second rotating element, and cams 150 that are rotatable locking members disposed between the inner and outer races.

The second clutch mechanism is a one-way ratchet clutch configured to transmit rotation at a predetermined angle by engagement between ratchet teeth 141 on a ratchet teeth holding member 140 that is a first engaging element and ratchet pawls 131 on a ratchet pawl holding member 130 that is a second engaging element.

The ratchet pawls 131 are configured to engage the ratchet teeth 141 when the teeth rotate relative to the pawls in one direction, while sliding over the ratchet teeth 141 in relative rotation in the other direction, with the relative distance between them changing.

In this embodiment, the ratchet pawls 131 are shaped similarly to the ratchet teeth 141. The ratchet pawl holding member 130 and the ratchet teeth holding member 140 are configured to move relative to each other in an axial direction. Instead, the ratchet pawls 131 may be provided on the ratchet pawl holding member 130 such as to be each pivotable.

The ratchet pawl holding member 130 is secured to an end face of the outer race 110. The ratchet teeth holding member 140 is secured to the inner race 120 and disposed to extend from an end face of the inner race 120 radially outward so that the ratchet pawls 131 and the ratchet teeth 141 face each other in the axial direction.

A side plate 151 is attached to the outer race 110. Thus the ratchet pawl holding member 130 and the side plate 151 define the axial position of the cams 150, which form the first clutch mechanism.

The operating mechanism for switching the actions of the first clutch mechanism includes a selector member 160 that fits on the inner race 120 and axially slidable on a selector sliding surface 122 of the inner race 120.

At one end of the inner race 120 is arranged an inner race stopper plate 123 that restricts the movement of the selector member 160 and prevents it from coming off.

The cams 150 in the first clutch mechanism are loaded toward the inner race 120 with a spring 170 passing over their pressing portions 152 as shown in FIG. 8. The cams are loaded also to rotate in the direction of the arrow to make contact with both of the inner race 120 and the outer race 110. The cams are designed to interrupt torque transmission, allowing relative rotation of the inner race 120 and the outer race 110 in one direction. The relative rotation between the inner race 120 and the outer race 110 in the other direction is stopped by the cams 150 slightly rotating in the direction of the arrow and wedging between the cam sliding surfaces 111 and 121 of the inner race 120 and the outer race 110, allowing for torque transmission.

The selector member 160 is configured to slide on the selector sliding surface 122 of the inner race 120 in the axial direction and under the pressing portions 152 to maintain the cams 150 in an orientation unloaded from either of the inner race 120 and outer race 110 against the biasing force of the spring 170. The selector member thus allows for free relative rotation of the inner race 120 and outer race 110 in both directions, interrupting the torque transmission in both directions.

The operating mechanism for switching the actions of the second clutch mechanism is configured to move the inner race 120 itself in an axial direction relative to the outer race 110 to change the distance between the ratchet teeth 141 on the ratchet teeth holding member 140 and the ratchet pawls 131 on the ratchet pawl holding member 130. The second clutch mechanism thus switches between a state where the ratchet mechanism is operable and transmits rotation in one direction only and a state where the ratchet pawls 131 separate from the ratchet teeth 141 so that the torque transmission is interrupted in both directions.

The inner race stopper plate 123 mentioned above and the selector member 160 serve to prevent the inner race 120 from sliding excessively in this switching operation.

The operation of the selectable clutch 100 configured as described above is explained.

FIGS. 1, 2, 4, and 5 illustrate the selectable clutch in a two-way free mode: The first clutch mechanism is in a free mode, with the selector member 160 in contact with the pressing portions 152 of the cams 150, and the second clutch mechanism is also in a free mode, with the inner race 120 slid back to keep the ratchet pawls 131 away from the ratchet teeth 141.

Sliding the selector member 160 to move away from the pressing portions 152 of the cams 150 in this state allows the first clutch mechanism to operate as a one-way clutch, bringing the selectable clutch into a one-way free mode.

As the selector member 160 further slides and contacts the inner race stopper plate 123, the inner race 120 slides, too, as a unit, so that the ratchet pawls 131 and the ratchet teeth 141 can engage each other. The second clutch mechanism can thus operate as a one-way clutch, in the opposite direction from that of the first clutch mechanism. This is a two-way lock mode where the selectable clutch transmits rotation in both directions.

This operation can be performed by directly sliding the inner race 120.

This embodiment adopts a configuration in which the selector member 160 of the first clutch mechanism can come into contact with the pressing portions 152 of the cams 150 only when the inner race 120 is positioned in the free mode of the second clutch mechanism. Therefore, the same operation of switching the first clutch mechanism in the two-way free mode by means of the selector member 160 causes the inner race 120 to slide and switch the second clutch mechanism, allowing for direct switching to the two-way lock mode.

When switching from the two-way lock mode, the selector member 160 is slid, causing the inner race 120 to also slide at the same time. Both the first clutch mechanism and the second clutch mechanism return to the free mode, i.e., the selectable clutch returns to the two-way free mode shown in FIGS. 1, 2, 4, and 5.

The two-way free mode can be switched to the one-way free mode where the second clutch mechanism is maintained in the free mode, by stopping the selector member 160 at the position before it causes the inner race 120 to slide during the switching of the first clutch mechanism.

While one embodiment of the present invention has been described in detail, the present invention is not limited to the above-described embodiment and may be carried out with various design changes without departing from the scope of the present invention set forth in the claims.

In the above embodiment, as described above, the selector member 160 of the first clutch mechanism can come into contact with the pressing portions 152 of the cams 150 only when the inner race 120 is positioned in the free mode of the second clutch mechanism. In an alternative configuration, both clutch mechanisms may be independently switchable, with the second clutch mechanism alone operable as a one-way clutch, allowing the switching between four modes including the one-way free mode in the opposite direction.

Other known switching mechanisms may be adopted to be used with the axially slidable selector member 160 and the sliding inner race 120 as the respective operating mechanisms of the first and second clutch mechanisms in the above embodiment.

The cams 150 used as the first clutch mechanism in the above embodiment may have a different shape depending on the required torque resistance or other properties. The first clutch mechanism may be configured as a clutch that uses rollers or the like instead of cams, to transmit rotation at any rotation angle by the rollers slightly moving and wedging between two rotating elements.

The second clutch mechanism may be configured with ratchet pawls 131 and ratchet teeth 141 that face each other in a radial direction, instead of the axial direction as in the above embodiment.

In yet another alternative configuration without the one-way free mode in the opposite direction as in the above embodiment, the second clutch mechanism may be configured as a dog clutch without the one-way clutch function. The cams may be designed in different shapes in accordance with required torque resistance and other properties.

What is claimed is:

1. A selectable clutch comprising:
   a first clutch mechanism and a second clutch mechanism for transmitting and interrupting rotation between coaxial and relatively rotatable first and second shafts; and
   an operating mechanism for switching actions of at least one of the first clutch mechanism and the second clutch mechanism, to allow switching between transmission and interruption of torque between the relatively rotatable first and second shafts,
   the first clutch mechanism being configured to transmit rotation at any rotation angle via a locking member disposed between a first rotating element and a second rotating element,
   the second clutch mechanism being configured to transmit rotation at a predetermined angle by engagement between a first engaging element and a second engaging element,
   wherein the first rotating element and the second rotating element are an outer race and an inner race disposed to slide into one another in an axial direction,
   the locking member is a plurality of cams, and
   the first clutch mechanism includes the plurality of cams circumferentially arranged between the outer race and the inner race, and a biasing mechanism biasing the plurality of cams.

2. The selectable clutch according to claim 1, wherein the operating mechanism includes a selector member configured to switch between a state allowing rotation of the cams and a state stopping rotation of the cams.

3. The selectable clutch according to claim 1, wherein the first engaging element and the second engaging element face each other, respectively having ratchet teeth and ratchet pawls.

4. The selectable clutch according to claim 3, wherein the first engaging element and the second engaging element face each other in an axial direction, and
   the operating mechanism is configured to move either the first engaging element or the second engaging element in an axial direction.

5. The selectable clutch according to claim 1, wherein
   the first engaging element and the second engaging element face each other in an axial direction,
   the first engaging element being formed by a plurality of ratchet pawls provided on an end face of the outer race,
   the second engaging element being formed by a plurality of ratchet teeth disposed to extend from an end face of the inner race radially outward.

6. The selectable clutch according to claim 1, wherein the locking member is at least one of movable and rotatable.

7. A selectable clutch comprising:
a first clutch mechanism and a second clutch mechanism for transmitting and interrupting rotation between coaxial and relatively rotatable first and second shafts; and
an operating mechanism for switching actions of at least one of the first clutch mechanism and the second clutch mechanism, to allow switching between transmission and interruption of torque between the relatively rotatable first and second shafts,
the first clutch mechanism being configured to transmit rotation at any rotation angle via a locking member disposed between a first rotating element and a second rotating element,
the second clutch mechanism being configured to transmit rotation at a predetermined angle by engagement between a first engaging element and a second engaging element,
wherein the first rotating element and the second rotating element are an outer race and an inner race disposed to slide into one another in an axial direction, and
the first engaging element and the second engaging element face each other in an axial direction,
the first engaging element being formed by a plurality of ratchet pawls provided on an end face of the outer race,
the second engaging element being formed by a plurality of ratchet teeth disposed to extend from an end face of the inner race radially outward.

8. The selectable clutch according to claim 7, wherein the locking member is a plurality of cams,
the first clutch mechanism includes the plurality of cams circumferentially arranged between the outer race and the inner race, and a biasing mechanism biasing the plurality of cams, and
the operating mechanism includes a selector member configured to switch between a state allowing rotation of the cams and a state stopping rotation of the cams.

9. The selectable clutch according to claim 7, wherein the operating mechanism is configured to move either the first engaging element or the second engaging element in an axial direction.

* * * * *